United States Patent [19]

McDaniel et al.

[11] 4,365,187
[45] Dec. 21, 1982

[54] BRUSHLESS D.C. MOTOR

[75] Inventors: Wharton McDaniel; Fred A. Brown, both of Woodstock; Donald Thompson, Kingston, all of N.Y.

[73] Assignee: Rotron Incorporated, Woodstock, N.Y.

[21] Appl. No.: 150,202

[22] Filed: May 15, 1980

[51] Int. Cl.³ .......................................... H02K 29/00
[52] U.S. Cl. .................................... 318/254; 318/138
[58] Field of Search ................... 318/254 A, 254, 138; 310/DIG. 3, 156

[56] References Cited

U.S. PATENT DOCUMENTS

| | | | |
|---|---|---|---|
| 3,230,434 | 1/1966 | Bauerlein | 318/254 A |
| 3,604,960 | 9/1971 | Kerstel | 318/254 A |
| 3,652,909 | 3/1972 | Rainer et al. | 318/254 A |
| 3,805,134 | 4/1974 | Osamu et al. | 318/254 A |
| 3,909,690 | 9/1975 | Sugiura | 318/138 |
| 3,988,652 | 10/1976 | Endo et al. | 318/254 A |
| 4,086,519 | 4/1978 | Persson | 318/254 A |
| 4,115,715 | 9/1978 | Muller | 318/254 A |
| 4,136,168 | 5/1979 | Vogel | 318/254 |
| 4,217,508 | 8/1980 | Uzuka | 310/67 R |
| 4,230,976 | 10/1980 | Muller | 318/254 A |

FOREIGN PATENT DOCUMENTS 2020780 12/1970 Fed. Rep. of Germany ... 310/DIG. 3

OTHER PUBLICATIONS

Gottleib, I. M., *Regulated Power Supplies*, Howard W. Sams and Co., Indianapolis, Ind., pp. 129-131.
Interim Bulletin, UGN-3013T, Sprague, Oct. 2, 1975.
"Hall Effect Devices and their Applications", *Electronics Industry*, May 1979, pp. 21-27.

*Primary Examiner*—David Smith, Jr.
*Attorney, Agent, or Firm*—Brumbaugh, Graves, Donohue & Raymond

[57] ABSTRACT

A D.C. brushless motor with a permanent magnet rotor employs Hall switches to effect commutation. The rotor magnets are of a greater axial length than the stator stack and the Hall switches are mounted on a printed circuit panel within the motor frame so as to be actuated by the fringe flux from the portion of a rotor magnet extending beyond the stator stack. The pole faces of the stator stack are stepped to assure proper starting and direction of rotation. A voltage regulating circuit forming part of the commutating arrangement on the printed circuit panel enables the same circuit to be used for a range of stator energizing voltages.

9 Claims, 6 Drawing Figures

BRUSHLESS D.C. MOTOR

BACKGROUND OF THE INVENTION

This invention relates to brushless D.C. motors and, more particularly, to such motors employing permanent magnet rotors and commutation circuits controlled by Hall effect elements.

Conventional D.C. motors, employing segmented commutators and brushes to achieve the polarity switching necessary for rotation, present certain obvious shortcomings. The wear on brushes and commutator segments necessitates periodic maintenance and/or replacement and the sparking occurring between the brushes and commutator segments produces undesirable radio disturbances. Moreover, the sparking presents a hazard where the motor is exposed to inflammable or explosive gases.

To avoid the disadvantages of mechanical commutation, a number of commutatorless systems for D.C. motors have been devised over the years. Basically, these systems employ some means for detecting or responding to rotation of the rotor to switch currents through the stator windings, so that the polarity of the latter are periodically reversed to maintain rotation. With the advent of solid state technology, it has been possible to reduce the physical size of the required circuitry such that it may be incorporated in the motor without any appreciable increase in overall size of the structure.

In one commercial form of brushless D.C. motor, a permanent magnet rotor is used and the rotation of the magnets is sensed by Hall effect elements. A Hall effect element, or Hall cell, is a low-power semi-conductor device, current flow through which can be altered by magnetic flux to produce a voltage output across a pair of output electrodes. The greater the magnetic flux density to which it is exposed, the greater the voltage output developed.

In these known motors employing Hall effect devices, the Hall effect devices are generally exposed to the magnetic fields generated by the permanent magnet rotor and the stator poles and complex circuitry is provided to sense the potential output of the Hall devices and generate the driving currents for the stator windings. Because of the normal response of Hall effect devices, these prior art motors require sophisticated mechanical adjustments to the rotor and/or stator structure to insure constant speed rotation of the rotor. These modifications may take the form of additional ferromagnetic members on the stator structure for the purpose of interacting with the rotor magnets to provide increments of torque in the gaps between energization of the stator windings. In another form, the air gap between the stator and rotor gradually increases and then decreases across each stator pole face for the purpose of storing and then releasing magnetic energy, to supply torque between periods of energization of the stator coils.

In other prior art systems, complex mounting arrangements for the Hall effect devices are necessary to expose them to the magnetic flux from both the rotor magnets and the stator poles so that they counter each other and reduce voltage peaks through the driving transistors for the motor coils, thereby smoothing operation of the motor.

Another problem inherent in prior art D.C. brushless motors is difficulty in starting rotation of the permanent magnet rotor, since the rotor tends to seek a rest position at the lowest reluctance point when the motor is shut off.

SUMMARY OF THE INVENTION

In accordance with the present invention, a D.C. motor is provided with permanent magnet rotor, a stator and a simple circuit employing Hall effect switches mounted in the motor structure for controlling rotation of the motor. The Hall effect switches employed are commercially available units comprising a Hall element and a trigger circuit, such as a Schmitt trigger, whose output is in binary form, i.e., at either zero voltage level or a predetermined positive voltage, depending upon the degree of energization of the Hall element. The binary output of the Hall switch is employed in a simple transistor circuit to provide suitable energization current to the stator coils.

Two Hall switches are employed, spaced, for example, 30 electrical degrees apart, to assure smooth operation and positive starting.

The permanent magnets on the rotor are selected to be of an axial length substantially greater than the axial length of the stator lamination assembly, or stator stack. A printed circuit board, in the form of a disc, is mounted at one end of a bearing tube on which the stator stack is carried and the Hall switches are mounted on the side of the circuit board facing the stator and rotor structure. The Hall switches are oriented on the panel such that the Hall element is opposite the portion of the rotor magnet extending beyond the end of the stator stack and is so positioned that the Hall element itself is responsive to the fringe flux emanating from the rotor magnets.

In the preferred embodiment, the features of the invention are embodied in an external rotor motor, i.e., a motor in which the rotor revolves around the stator. However, the principles of the invention are readily applicable to the conventional internal rotor motor.

By virtue of the novel circuit employed to effect switching of the stator poles, the same circuit board and components may be used with motors requiring different D.C. potentials for operation. For example, identical circuit boards may be utilized in motors whose operating voltages range up to 56 volts. This results in substantial manufacturing savings and simplicity, allowing production of a variety of motors for different purposes with substantial economies over systems requiring separate circuit designs for each different motor.

BRIEF DESCRIPTION OF THE DRAWINGS

The foregoing features and advantages of the present invention will become more apparent from the following detailed description thereof, when taken in conjunction with the accompanying drawings in which.

DETAILED DESCRIPTION OF THE INVENTION

Figure 1:
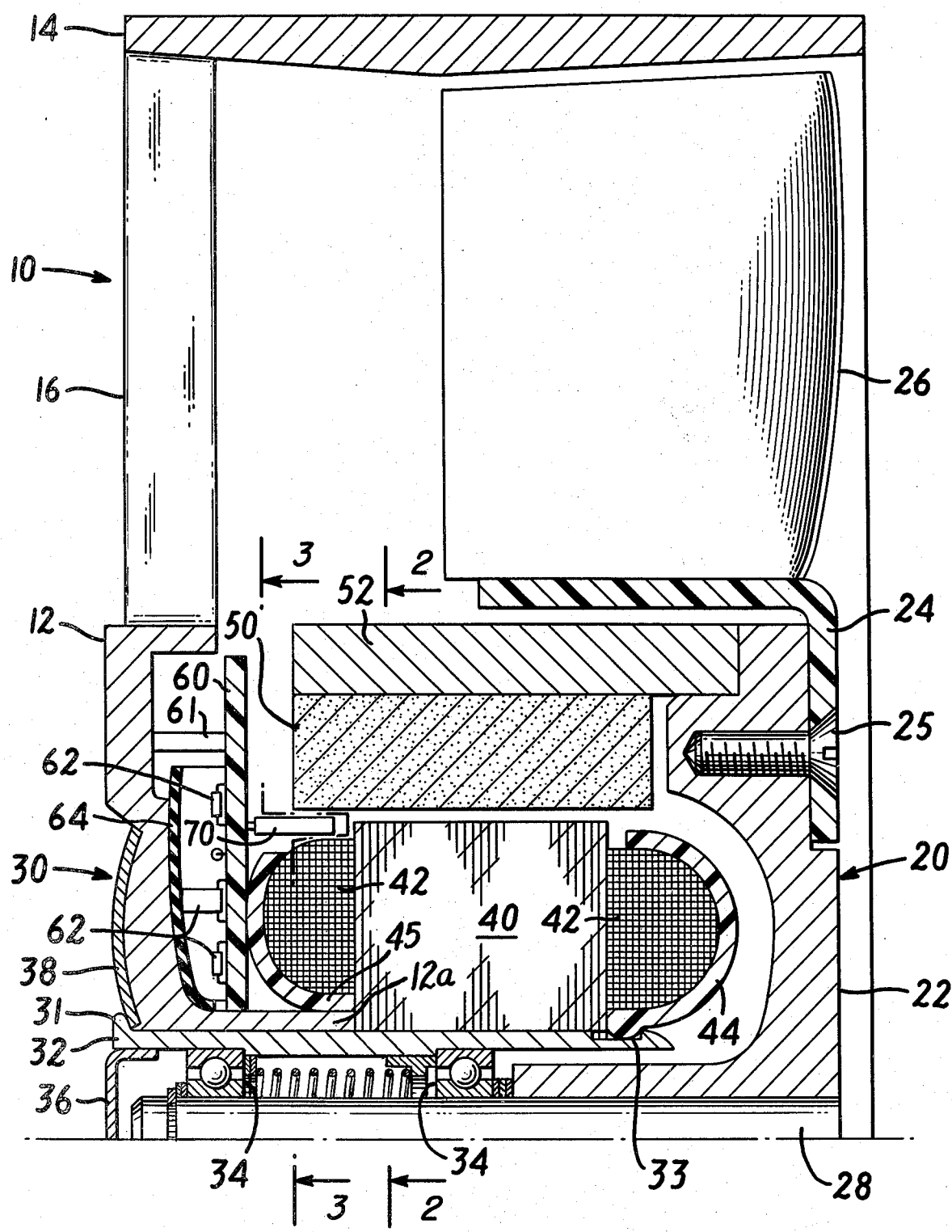
FIG. 1 is a partial cross-sectional view through a motor showing the mechanical arrangement of the motor of the invention.

The motor according to the invention will be described in connection with a typical application, such as a fan. Such a fan is indicated at 10 in FIG. 1, which is a cross-sectional view through the unit. Typically, a fan would comprise a spider or support plate 12 from which a series of outwardly extending struts 16 carry a venturi 14 which defines an air passage. The rotor assembly is indicated generally by the numeral 20 and the stator assembly by the numeral 30. Fans of this configuration are commonly known as tubeaxial fans.

A series of blades 26 extend radially from a hub 24 mounted on the rotor 20 of the motor. The hub 24 may be fastened by screws 25 or other suitable means to the rotor frame 22.

The spider 12 is generally circular in shape and includes an axial bore at its center defined by a tubular inward extension 12a. Extending through the bore of the tubular extension 12a is an arbor 32 which carries the stator laminations 40.

Similarly, the rotor frame 22 is circular in shape and carries a shaft 28 which extends inwardly of the frame along the motor axis. As seen in FIG. 1, with the stator and rotor assemblies combined to form the completed motor, the shaft 28 extends within the arbor 32, bearings 34 being provided to journal the shaft within the arbor. The arbor 32 is closed by a cap 36 which prevents leakage of the bearing lubricant and protects against dust and dirt. Although a conventional spring-loaded ball bearing arrangement is illustrated in the drawing, it will be understood that other appropriate types of bearings may be used.

Extending through slots 41 in the stator laminations (see FIG. 2) are the usual stator windings 42, the end turns of which are illustrated on either side of the laminations 40 in FIG. 1. Insulating end caps 44 and 45 surround and protect the end turns 42 of the stator windings against abrasion and damage.

The stator assembly 30 thus far described is of the snap-together construction shown in U.S. Pat. No. 3,919,572, granted Nov. 11, 1975 to Desy, and assigned to the present assignee. As is shown in the foregoing patent, and as illustrated in FIG. 1 herein, the stator 30, including arbor 32 with a radial flange 31 at its left end and the annular detent groove 33 near its right end, annular leaf spring 38, and insulating end caps 44, 45, is assembled by first slipping the leaf spring 38 over the arbor, followed by the spider 12, the intermediate elements 60 and 64 (to be described later), the end cap 45, the stator stack 40 with its end turns and, finally, the end cap 44 which has locking fingers forming its interior diameter. The dimensions of the foregoing elements and the location of the annular detent groove 33 on the arbor are such that when all these elements are pressed towards the flange 31 at the left hand end of the arbor, the locking fingers will engage the detent groove 33 on the arbor and hold the assembly firmly together.

Figure 5:
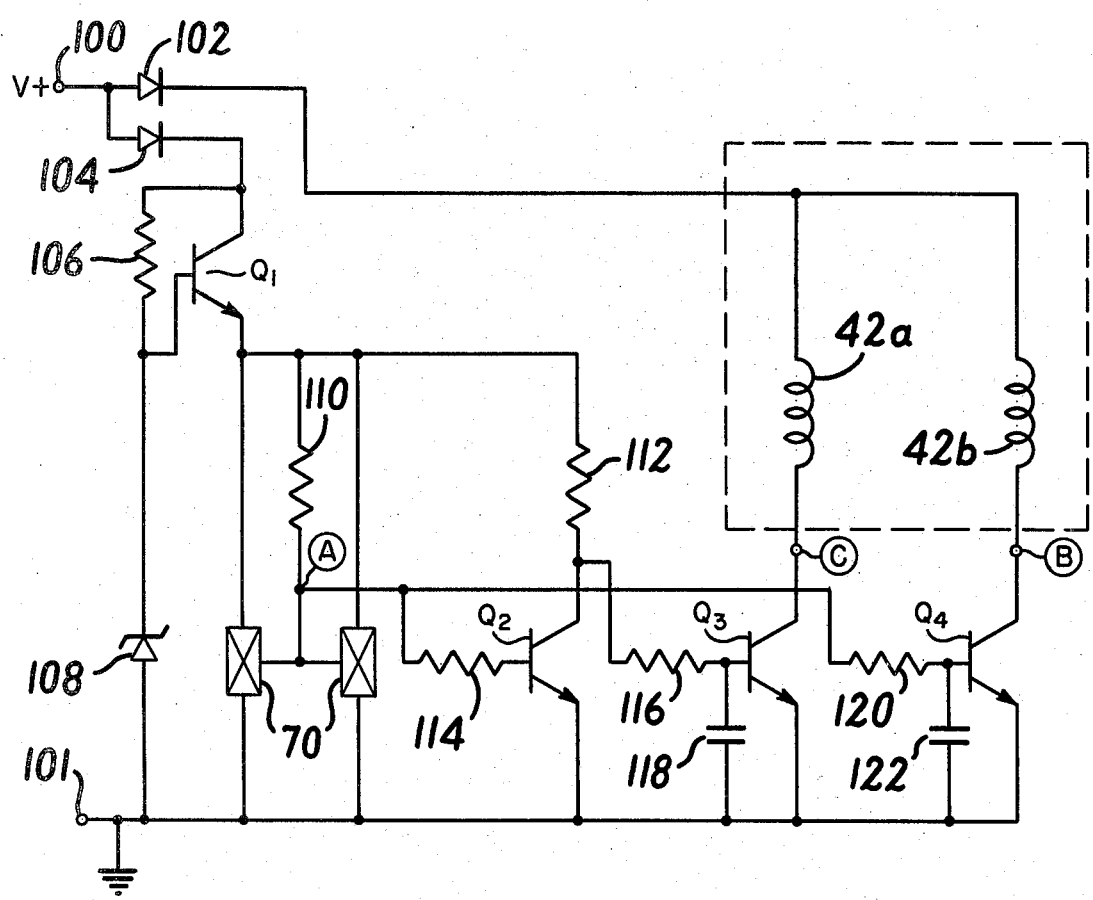
FIG. 5 is a schematic diagram of the commutating circuit in accordance with the present invention.

The member 60 is a disc-like printed circuit board holding the components of the electronic circuit illustrated in FIG. 5 and shown schematically at 62, and the numeral 64 designates an electrically insulating, thermally conducting layer which protects the circuitry on the board 60 and the elements from contact with conducting members of the stator assembly 30 while at the same time allowing heat to be conducted to the spider 12. The latter is made of aluminum or other highly thermally conductive material to act as a heat sink. A spacer ring 61 which may be integral with the spider 12 maintains the proper spacing of the circuit board 60 when the stator is assembled as above described. Power leads may be coupled from a suitable connector on the spider through a hollow strut 16 to the printed circuit board 60, in known fashion.

The rotor assembly includes an axially extending tubular member 52 which is supported in cantilever fashion from the periphery of the rotor frame 22. The member 52 is formed of material having good magnetic properties, such as cold rolled steel while the rotor frame 22 is of non-magnetic material, such as aluminum.

Figure 2:
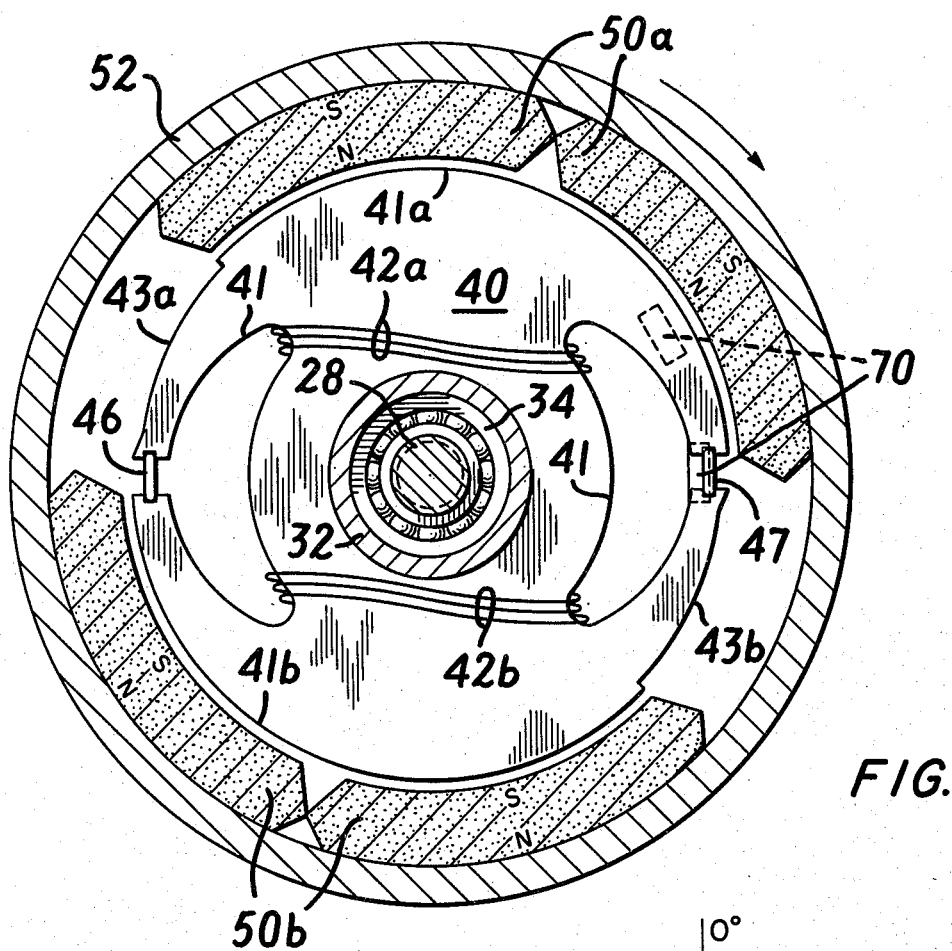
FIG. 2 is a simplified vertical section through the motor of the invention, taken along the line 2—2 of FIG. 1.

The member 52, referred to as the rotor back iron, carries on its interior surface a series of elongated, curved permanent magnets 50, disposed about the stator laminations, as better seen in FIG. 2. The magnets may be formed of any suitable material, although ceramic magnets are preferred.

As is evident from FIG. 1, the axial length of the magnets 50 is substantially greater than the axial length of the stator stack 40, enabling proper orientation of the Hall switches 70, as will be described hereinafter. The natural tendency of the rotor magnets to center themselves axailly with respect to the stator stack is accomodated in the motor design illustrated to minimize bearing stress.

Referring now to FIG. 2, which shows the shape of the stator laminations 40, it will be seen that the magnets 50 comprise two pairs of segmented elements 50a and 50b, disposed within the back iron cylinder 52. The magnets 50a and 50b each extend over somewhat less than 180 degrees of angular distance, e.g. 150°, leaving gaps between the two magnet segments. As indicated in FIG. 2, the magnet pair 50a is polarized such that its inner surface is its north pole and its outer surface its south pole, while the magnet pair 50b is polarized in a reverse manner.

The stator lamination 40 is of a generally conventional type, having winding slots 41 provided therein to accommodate the stator windings, shown diagramatically as 42a and 42b. Although shown as two separate windings in FIG. 2 and in the circuit of FIG. 5, the windings 42a and 42b may, in fact, be a single center-tapped winding.

The stator slots 41 are closed at their peripheral openings by magnetic bridges 46, 47 which complete the magnetic circuit of the stator. As will be explained hereinafter, the bridge member 46 is made longer than the stack of facilitate proper registration of the motor elements during assembly.

As illustrated in FIG. 2, each of the laminations 41 is formed with steps 43a and 43b extending about one quarter of the distance along the respective pole faces 41a and 41b. These steps, which are about nine to ten thousandths of an inch in depth, are formed at the trailing edge of each pole face (with the direction of rotation of the rotor being in the clockwise direction as seen in FIG. 2). In the assembled stack 40, each of the two pole faces will have a step, or reduced diameter portion, extending along its length at its trailing edge.

Since the step presents an air gap of increased reluctance as compared to the remainder of the pole face, the magnets 50a and 50b will center themselves around the remainder of the pole face, i.e., the low reluctance portion of the air gap, when the motor is in the unenergized condition. As will be explained more fully hereinafter, the angular displacement of the magnets with respect to the stator pole faces resulting from the step insures proper starting and direction of rotation of the motor.

Also shown in FIG. 2 are the positions of the two Hall effect switches 70 in the relation to the stator poles and the rotor magnets in an at-rest condition of the motor. One of the Hall switches is located substantially aligned with the opening in one of the stator slots while the other switch is displaced about 30 degrees in a counterclockwise direction from the first switch, while both are exposed to the magnetic field from the rotor magnets 50a; see also FIG. 1. The precise angular position of the Hall switches can be varied somewhat to optimize motor performance.

Figure 3:
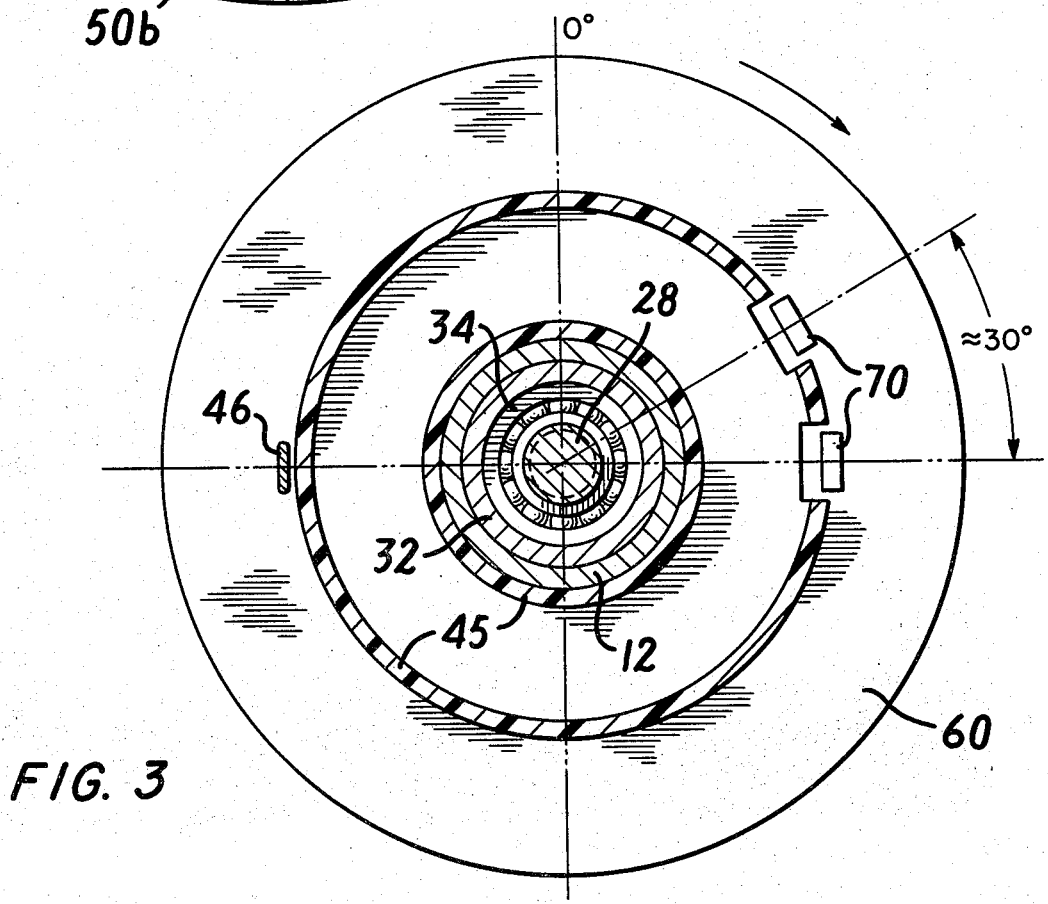
FIG. 3 is another vertical section of the motor of the invention, taken along the line 3—3 of FIG. 1, particularly showing the orientation of the Hall switches of the invention.
Figure 4:
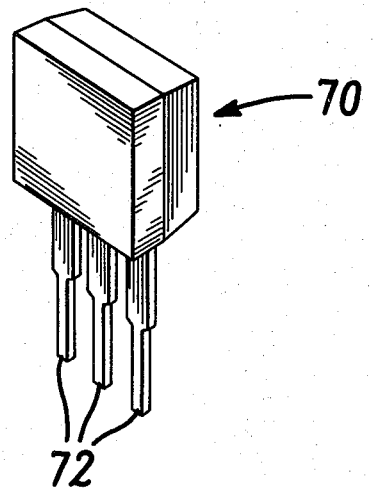
FIG. 4 is an illustration of a commercially available Hall switch of a type usable in the present invention.

FIG. 3 shows the face of the printed circuit board 60 from the same direction as the structure in FIG. 2. The Hall switches 70, the physical shape of which is illustrated in FIG. 4, are mounted with the pins 72 inserted into suitable sockets provided in the panels 60 so that the switch extends perpendicularly from the face of the panel. To allow the switches 70 to extend into the space between the magnets 50 and the stator end turns 42 (see FIG. 1) the plastic coil form 45 is notched as shown. To effect proper alignment of the stator assembly with respect to the Hall switches, and thus with the rotor in the at-rest condition, an opening is provided in the printed circuit panel opposite the Hall switches, to accommodate an extended portion of the bridge member 46 which closes the stator slot on the associated side of the stator. Thus, properly aligned assembly of the stator stack may be accomplished simply by slipping it over the arbor 32 and rotating it until the bridge member 46 engages the corresponding opening in the circuit panel 60. This key makes improper mounting of the stator stack on the arbor 32 impossible.

Turning back now to FIG. 2, it will be seen that with the rotor initially in the at-rest position shown, if pole 41a and 41b are magnetized with the proper polarities, magnets 50a will be attracted by pole 41b and repelled by 41a and magnets 50b attracted and repelled by poles 41a and 41b. This initial alignment starts the rotor structure rotating in the clockwise direction. If, as the rotor magnets reach their low reluctance position adjacent the opposite pole faces, the polarities of the poles are then switched, the movement of the rotor magnets will continue. Thereafter, alternate switching of the stator polarities will maintain rotation of the motor in that direction. That switching effect is achieved by the circuit of FIG. 5, the components of which are mounted on the circuit board 60.

A commercially available Hall switch suitable for use in the present invention is marketed by the semiconductor division of the Sprague Electric Company of Worcester, Mass. and designated as the Sprague type UGN-3013T Hall effect digital switch, illustrated in FIG. 4. The Hall element itself is centered with respect to the broad face of the package and is responsive to a predetermined magnetic field polarity. Thus, the units 70 must be oriented in a particular manner with respect to the activating magnetic field to produce the binary or digital voltage output required. In the present application, as seen in FIG. 1, the units 70 are mounted adjacent the interior wall of the magnets. Since the rotor magnets 50a are polarised differently from the magnets 50b, the Hall switches 70 will be activated only by one of the rotor magnet pairs. In the UGN-3013T switch, the Hall element is most responsive to flux from a south magnetic pole directed to the front face of the unit (the face bearing the Sprague part number).

FIG. 5 is a schematic diagram of the commutating circuit of the invention. It will be understood that the components and conductors illustrated in FIG. 5 are mounted on the printed circuit board 60 in the usual manner, discrete components such as transistors, resistors, etc. being designated generally by the numeral 62 in FIG. 1.

D.C. power is applied between positive terminal 100 and ground or negative pole 101 to supply both the stator coils and the commutating circuit. Diode 102 couples the input power to the common terminal of stator coils 42a and 42b while diode 104 couples power to a voltage dividing and regulating circuit for powering the commutating circuit.

The voltage dividing and regulating circuit includes resistor 106 and Zener diode 108 whose back voltage is selected to be about 9 volts. The resistor 106, together with transistor Q1, functions as a variable resistor and serves to maintain 9 volt D.C. at the emitter of Q1 over a range of differing D.C. input voltages V+. The stator windings may be designed for a specific applied voltage, for example, 12, 24 or 48 volts, depending upon required characteristics, while in each case, the commutating circuit elements would require the same 9 volt level. With the circuit of the invention, the circuit panel 60 and its components need not be changed for any of available input voltage extending up to 56 volts because the voltage division and regulating circuit consisting of transistor Q1, resistor 106 and Zener diode 108 provides the proper voltage level for the control circuit regardless of the voltage applied to the stator windings.

The Hall effect switches 70 are connected in parallel between the emitter of Q1 and ground with their output terminals connected by a resistor 110 to the 9 volt power supply at the emitter of Q1. Since, as described above, the output of the digital switch is in binary form, i.e., at some finite positive voltage or at ground, it will be seen that if the output of either or both of the switches are at the zero voltage level (the logical "0"), the voltage at their junction will be at the zero level. Only when both of the switches are at the positive voltage level (the logical "1") will the voltage at their junction be at the positive level. In the case of the UGN-3013T digital switch, the output of the unit will normally be at the logical "1", i.e., positive voltage, and will switch to the logical "0" (ground voltage) when the magnetic flux density to which it is exposed exceeds a predetermined threshold level.

With both of the switches 70 providing a logical "1" output, positive potentials are applied to the bases of transistors Q2 and Q4, rendering both of these transistors conductive. Conduction of transistor Q4 permits current flow through coil 42b, thereby energizing the corresponding stator pole. Conduction of transistor Q2 maintains transistor Q3 non-conductive, thereby preventing current flow through stator coil 42a.

When either or both Hall switches 70 are subjected to appropriate polarity and value of magnetic flux density, the output drops to the logical "0" state, turning off transistors Q2 and Q4. As transistor Q2 turns off, its collector voltage rises, turning on transistor Q3 to provide current flow through stator coil 42a. The turn-off of transistor Q4 terminates current flow through stator coil 42b. It will be seen then that alternate energization and de-energization of the Hall switches 70 by the magnets of the permanent magnet rotor will switch current flow between stator coils 42a and 42b, thereby alternately magnetizing the stator poles with opposite polarity. The resistance-capacitance network, 116, 118 at the base of Q3 and the similar network 120, 122 at the base of transistor Q4 prevent the respective transistors from turning on and off too rapidly, thereby reducing voltage and current transients to minimize radio frequency interference and power consumption of the circuit.

Figure 6:
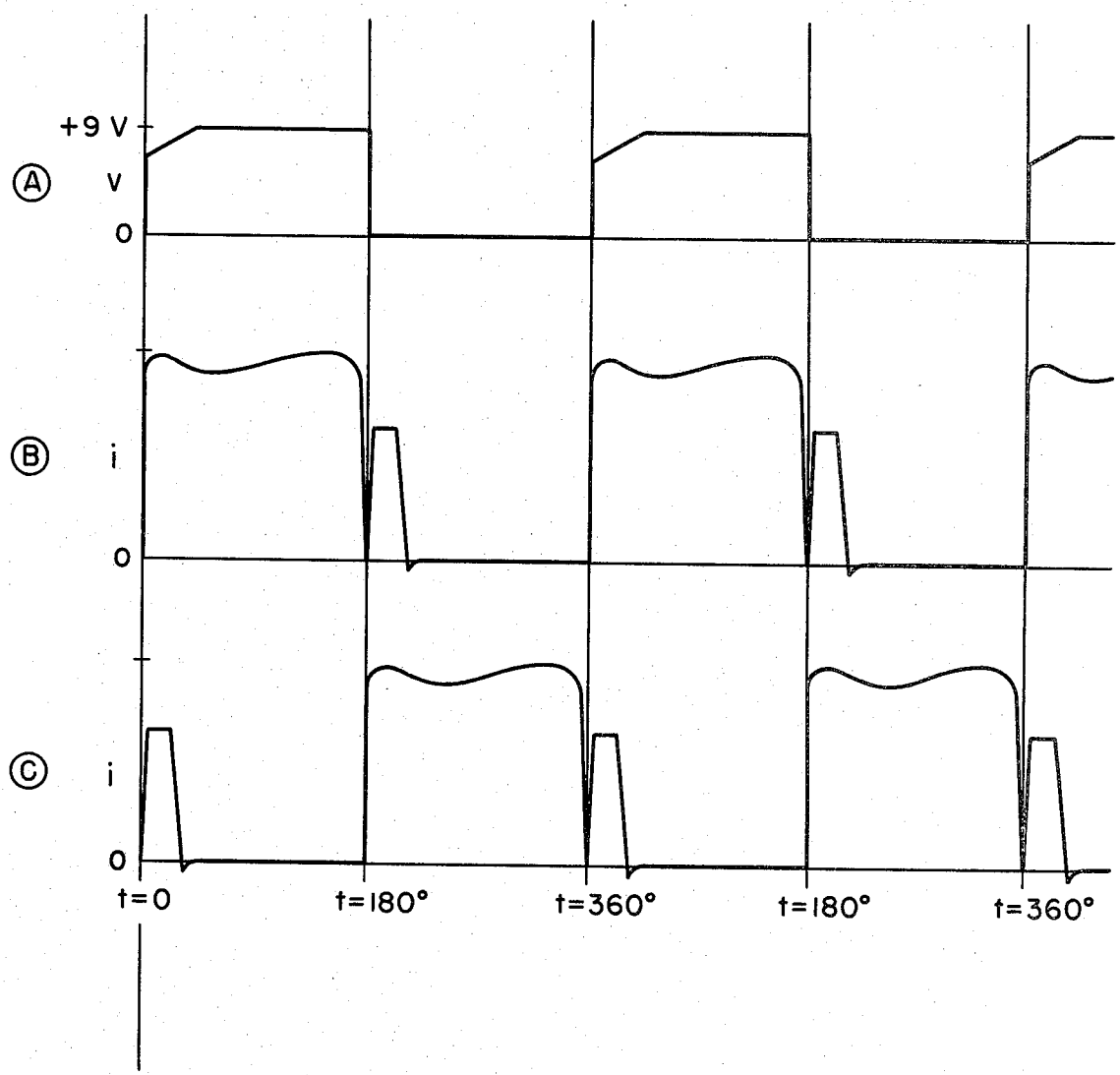
FIG. 6 illustrates a series of wave forms useful in explaining the operation of the circuit of FIG. 5.

The wave forms of FIG. 6 help to explain the operation of the circuit of FIG. 5. The wave form A appears at the common output terminal of the Hall switches 70, the +9 volt level representing the logical "1" condition. The sloped portion at the leading edge of each pulse represents the effect of the resistance-capacitance network at the base of transistor Q4.

The wave form B illustrates the current flow through the coil 42b when transistor Q4 is rendered conductive and wave form C the current flow through the stator coil 42a. The small current pulse appearing at the termination of each major current pulse represents the current flow produced by the inductive effect of the coil when applied curent ceases. Diode 102 prevents switching transients from the stator coils from reaching the power supply and diodes 102 and 104 protect against accidental reverse connection of the power supply.

Starting and rotation of the motor of the invention proceeds as follows. With no power supplied, the rotor of the motor would align itself, for example, in the rest position shown in FIG. 2. In this position, the Hall elements of the switches 70 are not affected, since the direction of the fringe flux from magnet 50a is opposite to the response characteristic of the element. Thus the Hall switches are not energized and their output (at point A, FIG. 5) is at the logical "1" level, turning on transistor Q4 and energizing stator coil 42b. Stator pole face 41b becomes a "south" pole and pole face 41a a "north" pole with coil 42b energized, tending to draw magnets 50a and 50b towards pole faces 41b and 41a, respectively, in the clockwise direction and, simultaneously, repelling magnets 50a and 50b from pole faces 41a and 41b, respectively.

As magnet 50a rotates past the Hall switches 70, the output of the latter remain in the "1" state and that condition will prevail until magnet 50b rotates to overlap the closest of the Hall switches.

At that instant, the fringe flux orientation from magnet 50b is in the proper direction to activate one of the Hall switches 70, thereby changing the output to the "0" state, turning off transistor Q4 and turning on transistor Q3. Current now flows through stator coil 42a energizing stator pole face 41a as a "south" pole and pole face 41b as a "north" pole. The attraction-repulsion sequence continues in this configuration for another 180° of rotation, i.e., until magnets 50b completely clear both Hall switches 70 and they return to their "1" states, whereupon stator coil 42b is again energized. The sequence continues to maintain rotation.

When power to the motor is turned off, the rotor will assume a rest position, such as shown in FIG. 2. In the motor illustrated, four rest positions are possible: two primary positions in which the rotor magnets are centered on the larger diameter stator pole surfaces, as in FIG. 2, and two secondary positions with the rotor magnets centered at points intermediate the primary positions. It does not matter which rotor magnet is facing which stator pole face when stopped, since the Hall switches will be appropriately energized or de-energized upon reapplication of power to assure immediate starting in the proper direction of rotation.

From the foregoing, it will be evident that the present invention provides a simple, reliable and inexpensive D.C. brushless motor that avoids many of the shortcomings of prior art devices. Although a two-pole embodiment has been described, the principles of the invention are equally applicable to other multiple pole configurations. Similarly, different configurations of the rotor magnets may be employed. For example, a single magnet segment may be used in place of each magnet pair 50a, 50b, or a continuous ring magnet with appropriately polarized segments may be employed. Further, as noted hereinabove, the invention is applicable to the conventional interior rotor-exterior stator motor arrangement, as well as the inverted configuration described. These and other modifications of the mechanical and electrical systems of the invention will become apparent to those skilled in the art without departing from the inventive concepts described herein and the scope of the invention is to be limited only by the appended claims.

We claim:

1. In combination, a D.C. brushless motor with stator windings and a permanent magnet rotor, semiconductor commutation circuit means for switching current to the windings of the stator in dependence on the angular position of the rotor, the permanent magnets of the rotor extending arcuately less than 180° and operative to impart rotary motion to the rotor upon commutated energization of the stator winding, the commutation circuit means including at least two Hall switching means for changing output states in response to a magnetic field, said Hall switching means being arcuately displaced and connected with winding activating switching means to energize at least one of the stator windings when only one of said Hall switching means changes output state in the presence of a magnetic field of one of said rotor magnets said two Hall switching means being connected in "or" fashion to the winding activating switching means to effect energization of one winding when either Hall switching means responds to the magnetic field of the one rotor magnet, whereby one winding is energized as one of the Hall switching means enters the magnetic field of the magnet and is de-energized when the other Hall switching means leaves the magnetic field of the one magnet, and whereby the effective arc of the rotor magnet is increased for commutation purposes.

2. The combination according to claim 1, wherein the rotor comprises two of said rotor magnets defining, respectively, North and South poles facing the Hall switching means and arcuate unmagnetized areas between the two magnets, the two Hall switching means being spaced apart arcuately substantially half the arcuate spacing between the two magnets.

3. The combination of a brushless D.C. motor and a commutation circuit; the motor having a stator with at least one winding thereon and a rotor carrying at least one permanent magnet, the commutation circuit including input connections for supplying a D.C. voltage to the motor, switching means for alternating the application of the D.C. voltage to the at least one winding to cause continuous rotation of the rotor, a Hall switch connected between the input connections and the switching means, said Hall switch being mounted for repeated application thereto of the magnetic field of the magnet and having an output switching sharply between binary "1" and "0" in response to the movement of the magnet into and out of proximity with the Hall switch, said Hall switch being connected in controlling relation with said switching means to effect commutation of the motor under the influence of the magnet, and means connected with said switching means for reducing the rate of change that the switching means provides each alternation of the voltage applied to the winding, said means for reducing the rate providing a change in voltage across the winding more gradually than the sharp change of binary states of the Hall switch to thereby substantially diminish interference resulting from said change in voltage.

4. The rotor and circuit according to claim 1, wherein said transistor means includes at least one transistor in series with each winding, said RC circuit being connected to the base drive to the transistors to effect initiation and termination of conduction of the transistor at a rate timed by the rate of change of voltage across the respective capacitor.

5. The motor and circuit according to claim 4, wherein the charging current path of the capacitor differs from the discharging current path of the capacitor, said charging current path having a higher resistance, delaying the energization of each winding by its respective transistor longer than the turn-off time of the transistor effecting de-energization of the winding.

6. In combination, a D.C. brushless motor with at least one stator winding and a permanent magnet rotor, a semiconductor commutation circuit means for switching current in the at least one winding of the stator in dependence on the angular position of the rotor and to change the angular position of the magnetic field of the stator, the rotor carrying at least one permanent magnet having at least one pole proximate the stator extending arcuately through a first angle and operative to impart rotary motion to the rotor upon commutated energization of the stator winding, the commutation circuit including switching means having a first state for conducting current through the winding in one direction and a second state terminating conduction of current through the winding in that direction, at least two Hall effect devices for changing output states in response to a magnetic field, said Hall devices being effectively arcuately spaced apart by a second angle and each coupled in control relation with the same switching means to cause that switching means to assume one of its said states when the first of the Hall devices is effectively proximate the rotor permanent magnet pole, maintaining the switching means in said one of its said states when either or both Hall devices are effectively proximate said magnet pole and returning the switching means to the other of its said states when the second Hall device effectively leaves the influence of the pole, whereby the commutation arc of the permanent magnet is extended beyond the first angle of its arcuate extent by substantially the second angle of effective arcuate spacing of the Hall devices.

7. The brushless D.C. motor of claim 3 wherein said Hall effect switch includes
   a hall cell providing an output voltage which is an analog of the magnetic flux density to which it is exposed, and
   a switching circuit responsive to the analog output voltage of said Hall cell to provide a binary output voltage.

8. The brushless D.C. motor of claim 3, said switching means comprising
   transistor means coupled to each of plural stator windings,
   said circuit means for reducing the rate including means responsive to the binary output of said Hall effect switches for activating and deactivating said transistor means more slowly than the Hall switch change of binary state, for alternately coupling said winding to said D.C. power supply means, while maintaining the rate of change of voltage across the winding sufficiently slow to substantially reduce interference producing transients.

9. The brushless D.C. motor of claim 8 wherein said voltage delay means comprises an R-C circuit for each of said transistor means.

* * * * *

UNITED STATES PATENT AND TRADEMARK OFFICE
CERTIFICATE OF CORRECTION

PATENT NO. : 4,365,187
DATED : December 21, 1982
INVENTOR(S) : Wharton McDaniel, et al.

It is certified that error appears in the above-identified patent and that said Letters Patent are hereby corrected as shown below:

In Column 4, line 29, "axailly" should read --axially--.

In Column 9, line 15, "claim 1" should read --claim 9--.

Signed and Sealed this

Twenty-second Day of February 1983

[SEAL]

Attest:

GERALD J. MOSSINGHOFF

Attesting Officer    Commissioner of Patents and Trademarks